(12) United States Patent
Juen

(10) Patent No.: US 8,687,102 B2
(45) Date of Patent: Apr. 1, 2014

(54) ELECTRONIC CAMERA THAT DISPLAYS INFORMATION REPRESENTATIVE OF ITS SELECTED MODE

(75) Inventor: Masahiro Juen, Kanagawa-ken (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/588,753

(22) Filed: Aug. 17, 2012

(65) Prior Publication Data

US 2012/0307095 A1 Dec. 6, 2012

Related U.S. Application Data

(63) Continuation of application No. 12/929,191, filed on Jan. 6, 2011, now abandoned, which is a continuation of application No. 11/075,333, filed on Mar. 9, 2005, now Pat. No. 7,903,162, which is a continuation of application No. 09/951,417, filed on Sep. 14, 2001, now abandoned, which is a continuation of application No. 08/937,805, filed on Sep. 25, 1997, now abandoned.

(60) Provisional application No. 60/040,922, filed on Mar. 27, 1997.

(30) Foreign Application Priority Data

Sep. 25, 1996 (JP) ..................................... 08-253343

(51) Int. Cl.
*H04N 5/222* (2006.01)
(52) U.S. Cl.
USPC ................................. 348/333.01; 348/333.02
(58) Field of Classification Search
USPC .................. 348/220.1, 229.1, 333.01–333.02
See application file for complete search history.

(56) References Cited

U.S. PATENT DOCUMENTS

| | | |
|---|---|---|
| 5,153,730 A | 10/1992 | Nagasaki et al. |
| 5,404,316 A | 4/1995 | Klinger et al. |
| 5,440,343 A | 8/1995 | Parulski et al. |
| 5,444,482 A | 8/1995 | Misawa et al. |
| 5,444,483 A | 8/1995 | Maeda |
| 5,477,337 A | 12/1995 | Schuler |
| 5,513,306 A | 4/1996 | Mills et al. |
| 5,793,923 A | 8/1998 | Sawanobori |
| 5,923,816 A | 7/1999 | Ueda |
| 5,943,050 A | 8/1999 | Bullock et al. |
| 5,956,083 A | 9/1999 | Taylor et al. |
| 6,034,728 A | 3/2000 | Arena |
| 6,342,900 B1 | 1/2002 | Ejima et al. |
| 6,441,854 B2 | 8/2002 | Fellegara et al. |
| 6,466,263 B1 | 10/2002 | Suzuki |
| 2002/0012051 A1 | 1/2002 | Mizoguchi |

OTHER PUBLICATIONS

Feb. 17, 2012 Office Action issued in U.S. Appl. No. 12/929,191.
Juen; U.S. Appl. No. 12/929,191, filed Jan. 6, 2011.

*Primary Examiner* — Kelly L Jerabek
(74) *Attorney, Agent, or Firm* — Oliff PLC

(57) ABSTRACT

An electronic camera is used with a display screen and includes an imaging device, a pixel density converter, a moving image recording device and a still image recording device. The imaging device images an object and converts the imaged object to image information. The pixel density converter converts the image information converted by the imaging device to a pixel density suitable for a scan format of the display screen. The moving image recording device successively retrieves the image information from the pixel density converter and records the image information in the recording medium as a series of moving images. The still image recording device retrieves the image information converted by the imaging device and records the image information in the recording medium as a still image.

2 Claims, 17 Drawing Sheets

ELECTRONIC CAMERA THAT DISPLAYS INFORMATION REPRESENTATIVE OF ITS SELECTED MODE

This is a Continuation of application Ser. No. 12/929,191 filed on Jan. 6, 2011, which is a Continuation of application Ser. No. 11/075,333 filed Mar. 9, 2005, which is a Continuation of application Ser. No. 09/951,417 filed Sep. 14, 2001, which is a Continuation of application Ser. No. 08/937,805 filed Sep. 25, 1997, which is a Non-Provisional of U.S. Provisional Application No. 60/040,922 filed Mar. 27, 1997. The disclosures of the previous applications are hereby incorporated by reference herein in their entirety.

INCORPORATED BY REFERENCE

The disclosure of the following priority application is herein incorporated by reference: Japanese Application No. 8-253343 filed on Sep. 25, 1996.

BACKGROUND OF THE INVENTION

1. Field of Invention

This invention relates to an electronic camera that records both moving images and still images.

2. Description of Related Art

In recent years, electronic cameras have been developed that photoelectrically convert an object to image information of a moving image, execute image compression such as high efficiency coding on that image information, and record the compressed image information in a recording medium.

As representative of this kind of electronic camera, digital video (DV) cameras are known. In a DV camera, a still image recording mode is provided and it is possible to record one frame of a still image and combine it with a sound signal over a number of seconds.

In this conventional example, a still image is recorded as a snapshot corresponding to one frame of a moving image. However, in this conventional example, a still image is recorded in the image quality of one frame of a moving image (for example, in the NTSC method of a YC component, excluding the retracing period), the vertical degree of resolution is 480 lines and the horizontal degree of resolution is 500 lines.

SUMMARY OF THE INVENTION

Therefore, an object of the present invention is to provide an electronic camera that cat record a still image at a high image quality.

Another object of the present invention is to provide an electronic camera that can image still objects or subjects at will, even while recording a moving object or subject.

Yet another object of the present invention is to provide an electronic camera that is designed to share the recording process for still images and the recording process for moving images.

A still further object of the present invention is to provide an electronic camera that can record still images at a high image quality, while designing the electronic camera so that it is made to share the recording process for still images and the recording process for moving images.

Another object of the present invention is to provide an electronic camera that can image still images at will, even while recording a moving image.

Still further, another object of the present invention is to provide an electronic camera that can enhance the operational quality relating to recording changeover between still images and moving images.

Accordingly, an electronic camera is used with a display screen and includes imaging means, pixel density conversion means, a recording medium, moving image recording means and still image recording means. The imaging means images an object and converts the imaged object to image information. The pixel density conversion means converts the image information converted by the imaging means to a pixel density suitable for a scan format of the display screen. The moving image recording means successively retrieves the image information from the pixel density conversion means and records the image information in the recording medium as a series of moving images. The still image recording means retrieves the image information converted by the imaging means and records the image information in the recording medium as a still image.

The imaging means includes an imaging pixel number and the scan format includes a scan pixel number wherein the imaging pixel number is larger than the scan pixel number. The pixel density conversion means reduces the image information converted by the imaging means to a pixel density that is suitable for the scan format. Preferably, the electronic camera of the present invention includes buffer means that temporarily stores the image information from the imaging means upon receipt of a command for recording still images when the command far recording is given from an external source during a recording period of the moving image recording means. The still image recording means, waits until completion of recording by the moving image recording means and records the image information stored in the buffer means in the recording medium. Preferably, the moving image recording means and the still image recording means share a coding conversion component for executing high efficiency coding within a field or frame on the image information that has been retrieved.

It is preferable that the electronic camera of the present invention include a recording switch and a changeover switch. The recording switch receives a recording command from an external source. The changeover switch which receives the recording command from the recording switch can be used either for the moving image recording means or for the still image recording means in response to a mode changeover command from an external source.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
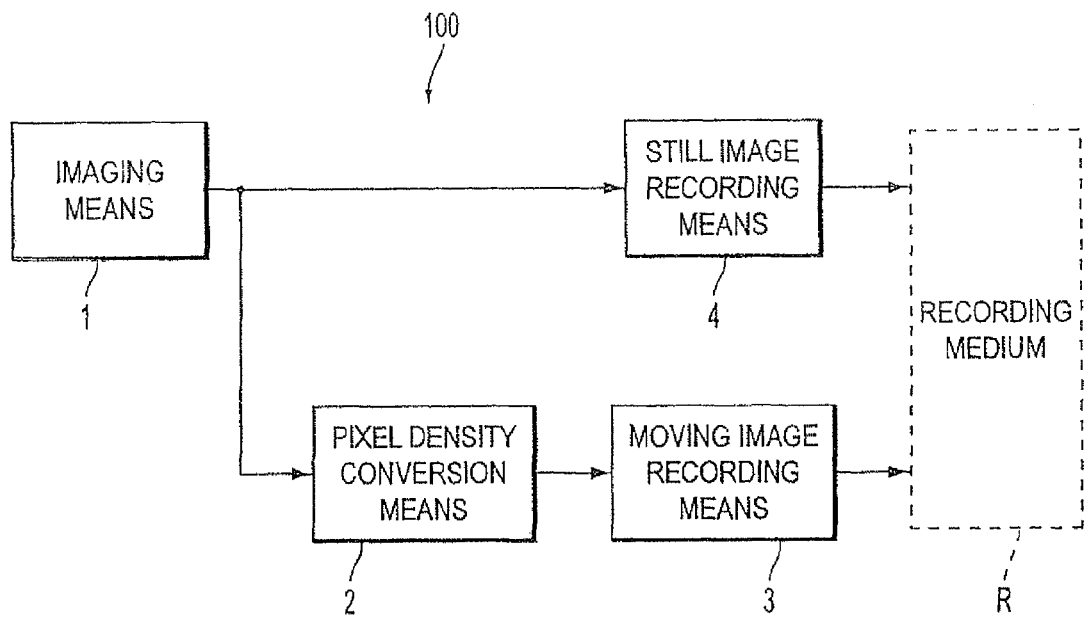
FIG. 1 is a block diagram depicting an exemplary embodiment of an electronic camera of the present invention.

FIG. 1 is a block diagram of an exemplary embodiment of the present invention.

In FIG. 1, an electronic camera 100 includes an imaging means 1 that images an object or living subject (hereinafter referred to as "object") and converts an image thereof to image information. A pixel density conversion means 2 converts the image information converted by the imaging means 1 to a pixel density suitable for a scan format of a display screen. A moving image recording means 3 successively retrieves the image information in which the pixel density has been converted by the pixel density conversion means 2 and records it in a recording medium R as a series of moving images. A still image recording means 4 retrieves image information converted by the imaging means 1 to record it in the recording medium R as a still image.

Figure 8:
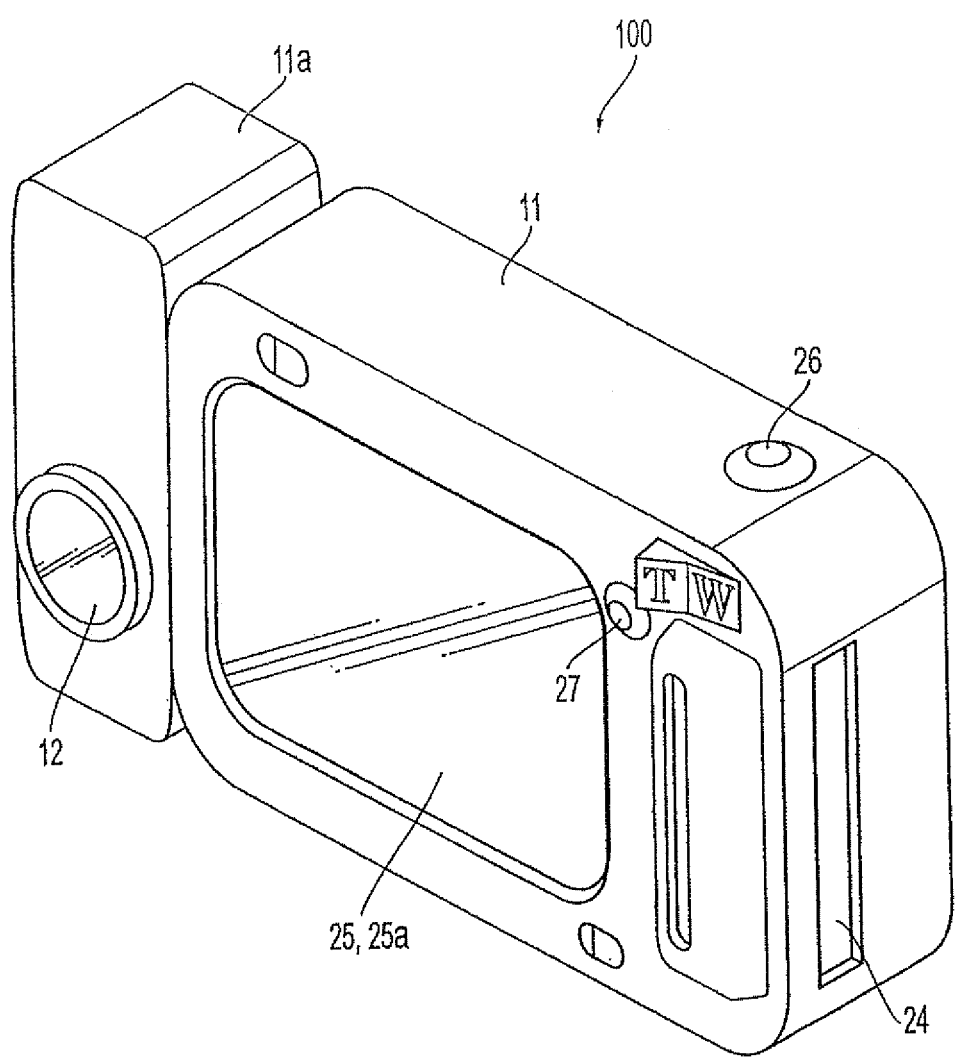
FIG. 8 is a perspective view of the first preferred embodiment of the electronic camera of the present invention.

When performing the recording of a moving image, first, the image information from the imaging means 1 is converted via the pixel density conversion means 2 to a pixel density that is compatible with a scan format of a display screen 25 (shown in FIG. 8). Although not by way of limitation, the display screen 25 can be an electronic viewfinder, a monitor screen attached to the case of the electronic camera, a device displaying the playback of the image information from the recording medium R (for example, a television or a computer monitor) or an image display device connected to an image output terminal of the electronic camera.

The moving image recording means 3 retrieves the image information after pixel density conversion, creates a moving image, and records the moving image in the recording medium R. On the other hand, when performing the recording of a still image, the image information is not retrieved by the pixel density conversion means 2 but rather by the still image recording means 4. The still image recording means 4 records the image information in the recording medium R.

The imaging means 1 has a pixel number that is larger than the pixel number of the scan format. Accordingly, the pixel density conversion means 2 reduces the image information converted by the imaging means 1 to a pixel density that is suitable for the scan format. Therefore, the image information is created in the imaging means 1, in a pixel density that is higher than the pixel density of the scan format.

At this time, when a moving image is recorded, the pixel density conversion means 2 reduces the density of the image information that initially has a high pixel density to a pixel density appropriate to the scan format. The moving image recording means 3 records the image information after this conversion to the recording medium R. On the other hand, when the still image is recorded, the still image recording means 4 records the image information in a state in which the pixel density is high in the recording medium R as a still image.

Figure 2:
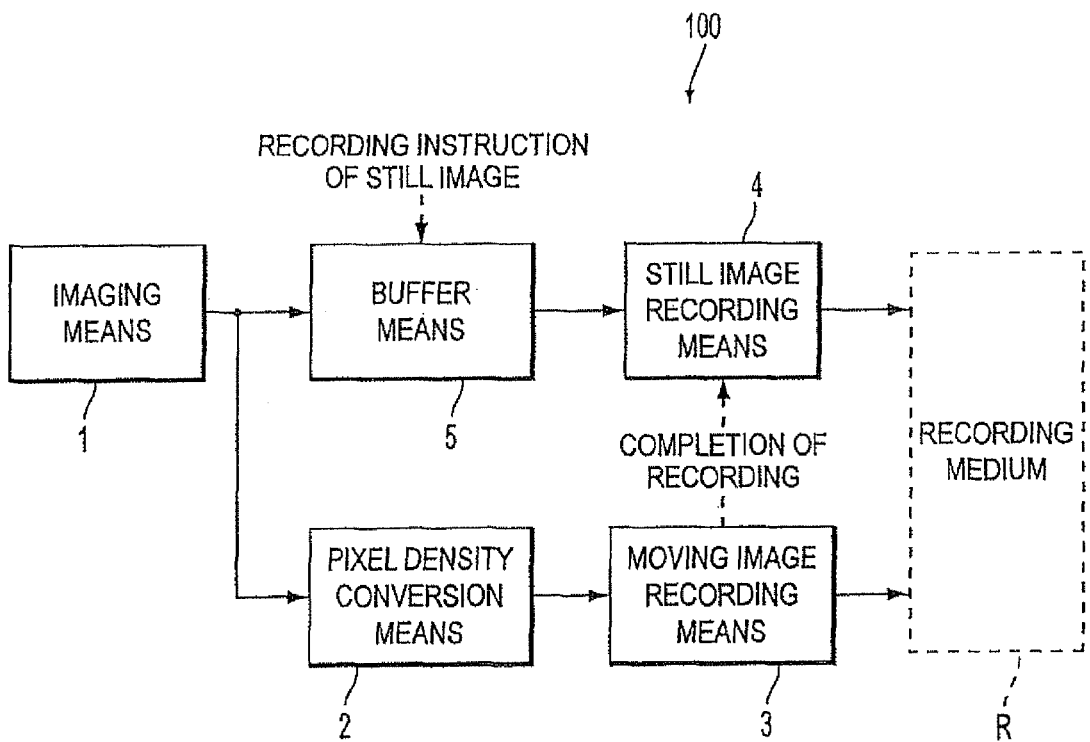
FIG. 2 is a block diagram depicting another exemplary embodiment of the electronic camera of the present invention.

FIG. 2 is a block diagram of another exemplary embodiment of the present invention.

In FIG. 2, the electronic camera 100 is equipped with a buffer means 5 that temporarily stores the image information from the imaging means 1 upon receipt of a command for recording still images when the command for recording is given from an external source during a recording period of the moving image recording means 3. The still image recording means 4 waits for completion of recording by the moving image recording means 3 and records the image information stored in the buffer means 5 in the recording medium R.

When the still image recording command is supplied from an external source during the moving image recording period, the buffer means 5 temporarily stores the image information from the imaging means 1. The still image recording means 4 waits for completion of recording of the moving image recording means 3 and records the image information stored in the buffer means in the recording medium. R. By doing this, it is possible to reliably image snapshots even during recording of moving images.

Figure 3:
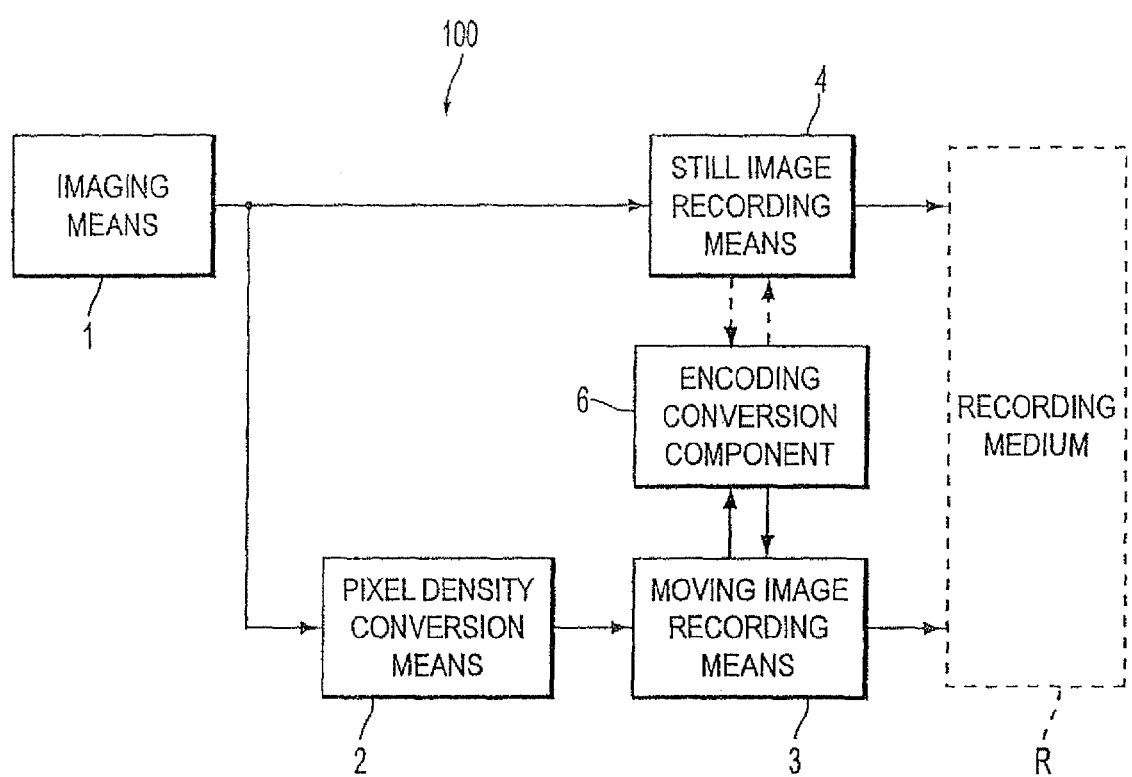
FIG. 3 is a block diagram depicting another exemplary embodiment of the electronic camera of the present invention.

FIG. 3 is a block diagram of another exemplary embodiment of the present invention.

In FIG. 3, the moving image recording means 3 and the still image recording means 4 share a coding conversion component 6 for executing high efficiency coding within a field or frame on the image information that has been retrieved.

The moving image recording means 3 and the still image recording means 4 share the coding conversion component 6 that performs high efficiency coding (i.e., compression) of the image information. For example, in a moving image coding conversion section, processes are performed such as a DCT (Discreet Cosine Transform) calculation, predictions between the frames, variable length coding, and the like. On the other hand, in a still image coding conversion processes are performed such as a DCT calculation, variable length coding and the like. Therefore, the processes within a frame or field in the moving image coding conversion section are the same as the processes for the still image coding conversion section. It is possible to simplify the calculation process algorithms, the circuit structure of the electronic camera and the like by providing the coding conversion component 6 to perform these common processes.

Figure 4:
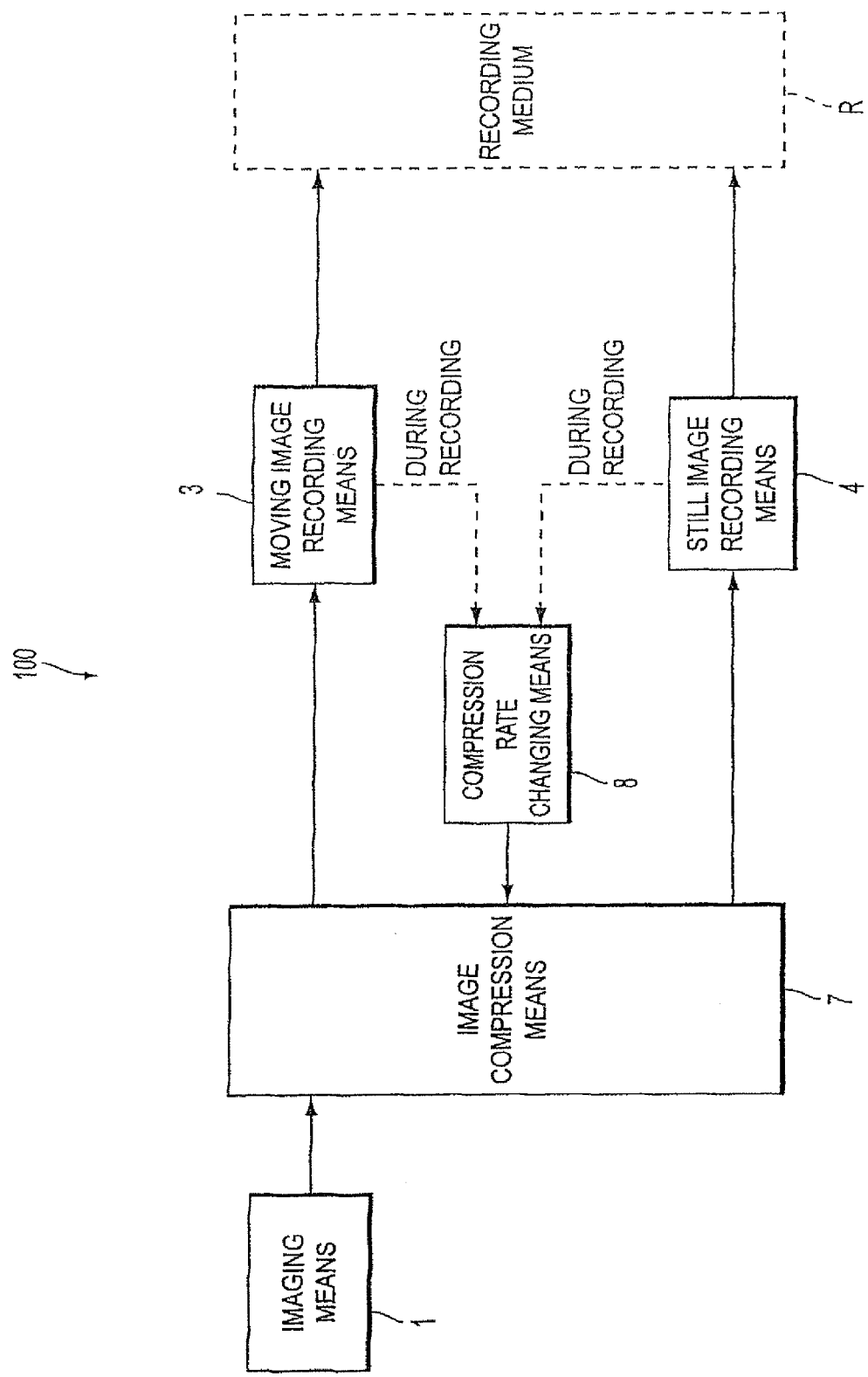
FIG. 4 is a block diagram depicting another exemplary embodiment of the electronic camera of the present invention.

FIG. 4 is a block diagram of another exemplary embodiment of the present invention.

In FIG. 4, the imaging means 1 images the object and converts it to image information. An image compression means 7, which can be any conventional image compression device known in the art, compresses image information imaged by the imaging means 1. The moving image recording means 3 successively retrieves the image information compressed by the image compression means 7 to record it in the recording medium R as moving images. The still image recording means 4 retrieves the image information compressed by the image compression means 7 to record it in the recording medium R as a still image. A compression rate changing means 8 which can be any conventional compression rate changing device known in the art increases the compression rate of the image compression means 7 during recording of the moving image recording means 3 and lowers the compression rate of the image compression meats 7 during recording of the still image recording means 4. The compression rate is the ratio of the amount of information before compression to the amount of information that remains after compression. The compression rate of the image compression means 7 is raised during recording of a moving image, and the compression rate is lowered during recording of still images.

Figure 5:
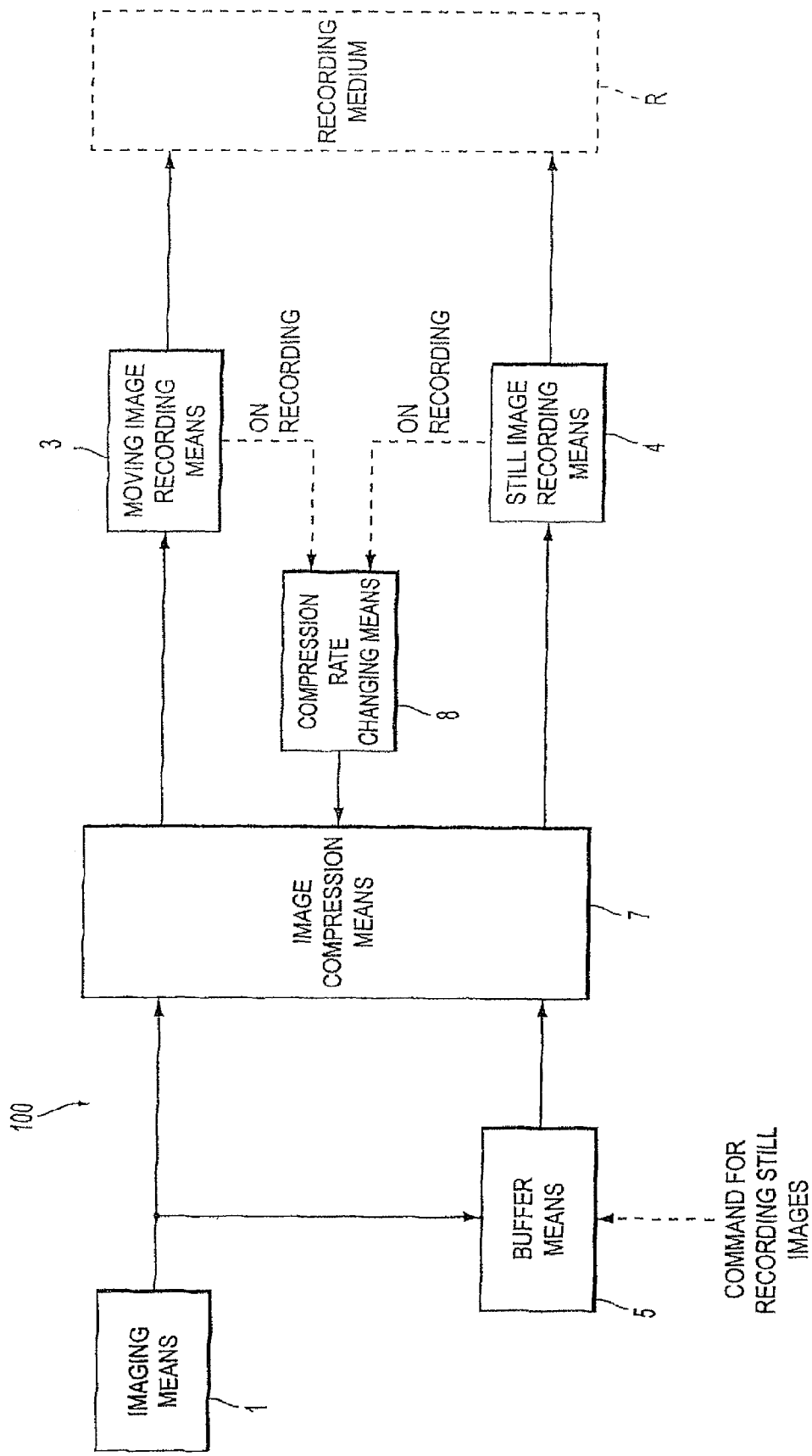
FIG. 5 is a block diagram depicting another exemplary embodiment of the electronic camera of the present invention.

FIG. 5 is a block diagram of another exemplary embodiment of the present invention.

In FIG. 5, the electronic camera is equipped with the buffer means 5 that temporarily stores the image information from the imaging means 1 upon receipt of the command for recording still images when the command for recording is given from the external source during the recording period of the moving image recording means 3. The image compression means 7 waits for completion of recording by the moving image recording means 3 and compresses the image information stored in the buffer means 5. The still image recording means 4 retrieves the image information from the buffer means 5 that has been compressed by the image compression means 7 and records it in the recording medium R as a still image.

When the still image recording command is externally supplied during the moving image recording period, the buffer means 5 temporarily stores image information from the imaging means 1. In this state, the image compression means 7 waits for the completion of recording of the moving image recording means 3 and compresses the image information stored in the buffet means 5 (using the still image compression rate supplied by compression rate changing means 8). The still image recording means 4 records the image information compressed in this manner in the recording medium R.

Figure 6:
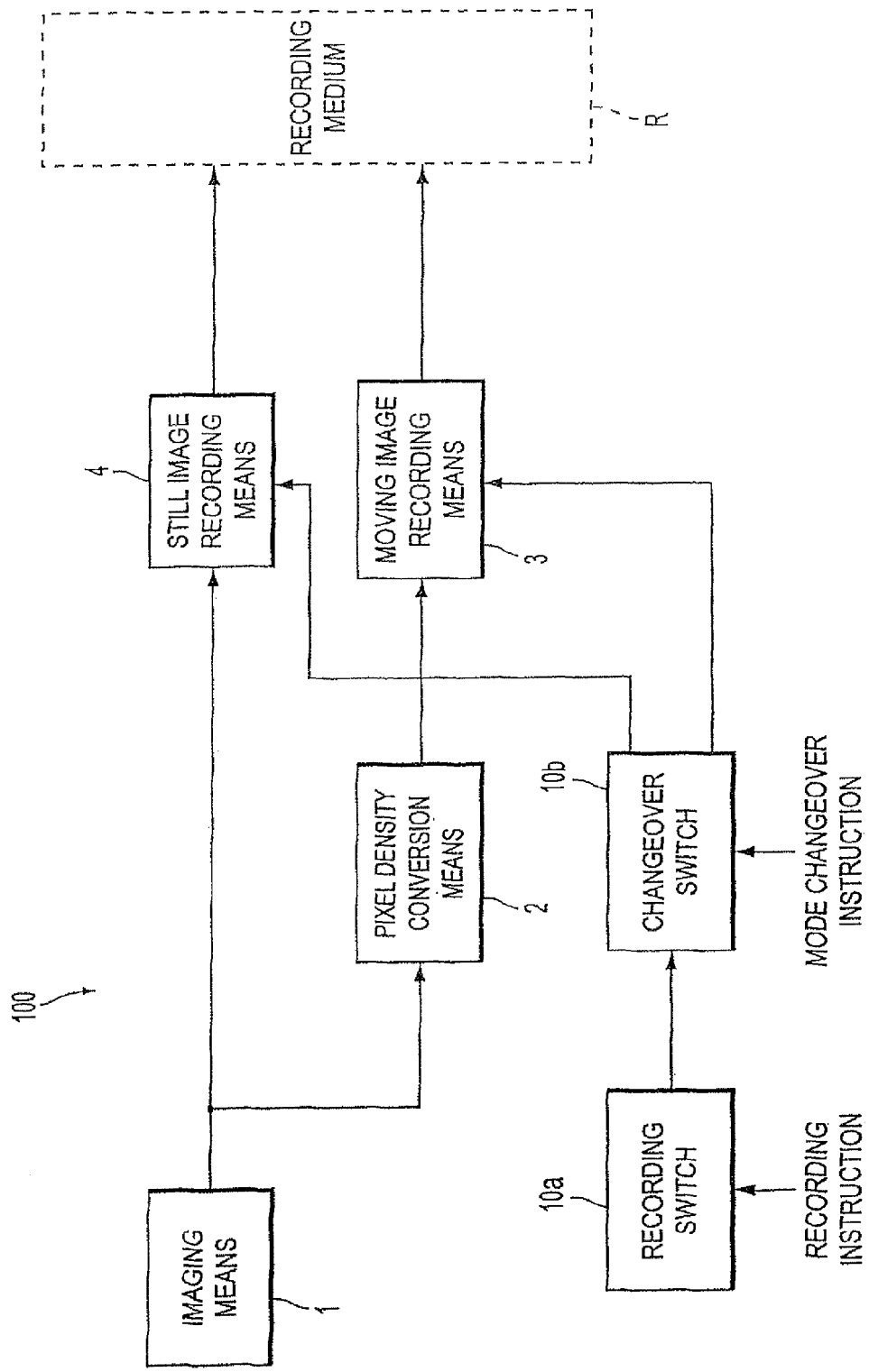
FIG. 6 is a block diagram depicting another exemplary embodiment of the electronic camera of the present invention.

FIG. 6 is a block diagram of another exemplary embodiment of the present invention.

In FIG. 6, the electronic camera includes a recording switch 10a that receives a recording command from the external source and a changeover switch 10b in which the recording command received by the recording switch 10a can be used either for the moving image recording means 3 or for the still image recording means in response to a mode changeover command from the external source. As a result of changing over by the changeover switch 10b, the recording switch 10a has a dual use as the switch operating the still image recording means 4 and the moving image recording means 3.

The preferred embodiments of the electronic camera of the present invention are described below based on the drawings.

Figure 7:
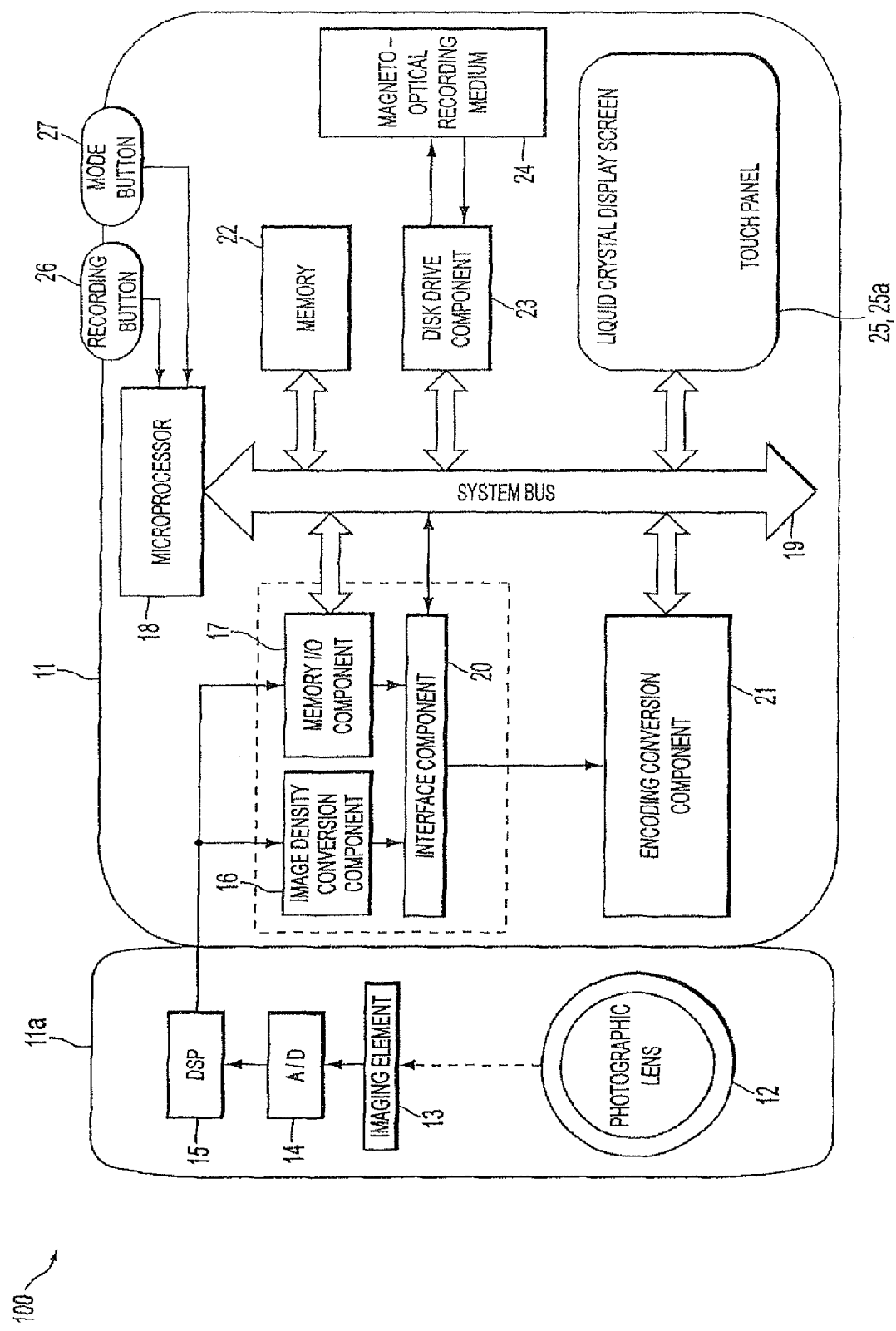
FIG. 7 is a block diagram of a first preferred embodiment of the electronic camera of the present invention.

FIG. 7 is a block diagram of a first preferred embodiment of the present invention. FIG. 8 shows an outer appearance of the first embodiment of the present invention.

In FIGS. 7 and 8, on a side surface of a main body 11 of the electronic camera, a camera part 11a is installed so that it freely rotates, and a photographic lens 12, that performs image resolution of the object image, is attached to the camera part 11a.

Light passing through the photographic lens 12 is refracted within the camera part 11a, and received by a photoreceptor surface of an imaging element 13, which is composed of a CCD image sensor. For example, the number of pixels of the imaging element 13 is 960 in length×1280 in width, which is twice the degrees in both length and width of the effective resolution in a NTSC method.

The photoelectric output of the imaging element is connected to a picture image signal processor 15 that performs white balance adjustment, gamma correction, or the like via an A/D converter 14.

The image information of the picture image signal processor 15 is input to an image density converter 16 and a memory I/O component 17.

The image density converter 16 performs conversion of the pixel density by executing interpolation, dividing into identical blocks, thinning, and the like, to the pixel value of the image information.

The memory I/O component 17 controls input and output of the image information to a system bus 19 of a microprocessor 18.

The output of the image density converter 16 and the memory I/O component 17 is input to a coding conversion component 21 via an interface component 20.

The interface component 20 communicates with the microprocessor 18 via the system bus 19.

To the system bus 19, a memory 22, disk drive part 23, the liquid crystal display screen 25, and a touch panel 25a are respectively connected.

The memory 22, in conjunction with being used in the information processing of the microprocessor 18, is also used as a buffer for temporarily storing image information.

A magnetooptical recording medium 24 is externally installed to a disk drive component 23.

The liquid crystal display screen 25 is arranged on the rear surface side of the main body 11, and the touch panel 25a is provided over the surface of the liquid crystal display screen 25.

An image recording button 26, and a mode button 27 are arranged on the main body 11 and are connected to the microprocessor 18.

Figure 9:
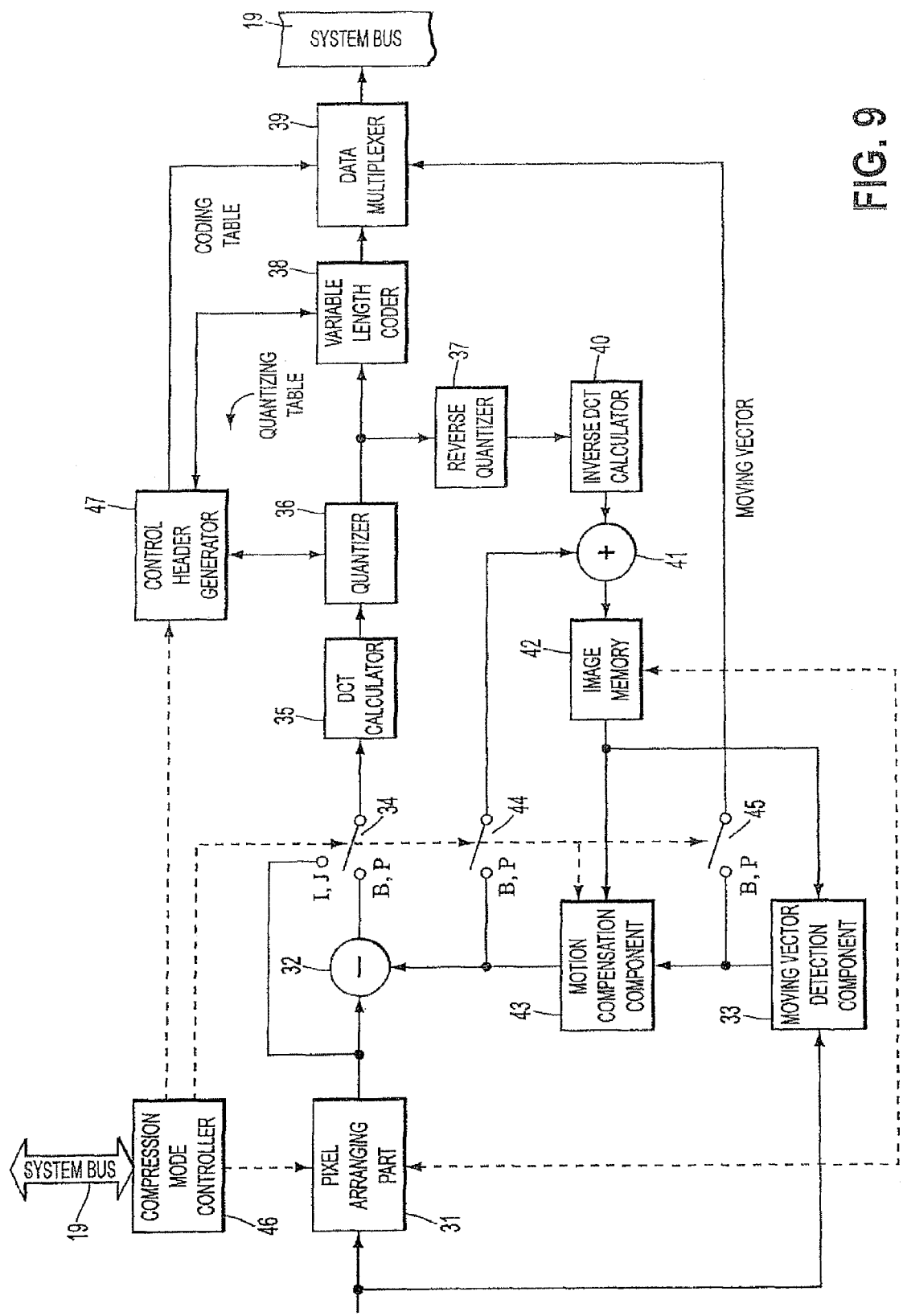
FIG. 9 is a block diagram illustrating a structure of a coding conversion component.

FIG. 9 is a block diagram describing the structure of the coding conversion component 21.

In FIG. 9, the image information input via the interface component 20 (FIG. 7) is provided to a pixel arranging component 31 and a moving vector detection component 33. The output of the pixel arranging component 31 is connected respectively to a first input of a subtracting device 32 and a first input of a first switch 34.

The output of the subtracting device 32 is connected to a second input of the first switch 34, and the output of the first switch 34 is connected to a quantizer 36 via a DCT calculator 35: The output of the quantizer 36 is connected to a reverse quantizer 37 and a variable length coder 38. The output of the variable length coder 38 is connected to a first input of the data multiplexer 39.

On the other hand, the output of the reverse quantizer 37 is connected to a first input of an adding component 41 via a inverse DCT calculator 40. The output of adding component 41 is connected to an image memory 42 having the storage capacity of a frame of image data. The image information accumulated in the image memory 42 is input to a second input of the moving vector detection component 33 and a first input of a motion compensation component 43.

The output of the moving vector detection component 33, in conjunction with being connected to a second input of the motion compensation component 43, is connected to a second input of the data multiplexer 39 via a second switch 45.

The prediction-between-the-frames result output from the motion compensation component 43, in conjunction with being input to a second input of the subtracting device 32, is input to a second input of the adding component 41 via a third switch 44.

On the other hand, the control output of the compression mode controller 46 connected to the system bus 19, is connected to the pixel arranging part 31, the first switch 34, the third switch 44, the second switch 45, the control header generator 47, and the like.

The input/output of the control header generator are connected individually to the quantizer 36, the variable length coder 38 and to a third input of the data multiplexer 39.

The output of the data multiplexer 39 is connected to the system bus 19.

With respect to FIGS. 1-6, the imaging means 1 includes the photographic lens 12, the imaging element 13, the A/D converter 14, and the picture image signal processor 15. The pixel density conversion means 2 includes the image density converter 16. The moving image recording means 3 includes the coding conversion component 21, the disk drive component 23 and a command controlling the recording operation of the moving image of the microprocessor 18. The still image recording means 4 includes the coding conversion component 21, the disk drive component 23, and a command controlling the recording operation of the still image of the microprocessor 18. The buffer means 5 includes the image compression means 7 aid the memory 22. The coding conversion component 6 includes the pixel arranging component 31, the DCT calculator 35, the quantizer 36, the variable length coder 38, and the data multiplexer 39. The recording switch 10a includes the image recording button 26 and the changeover switch 10b corresponds to the mode button 27. The various means of FIGS. 1-6 are not limited to these structures, which only relate to one possible implementation of the invention.

Figure 10A:
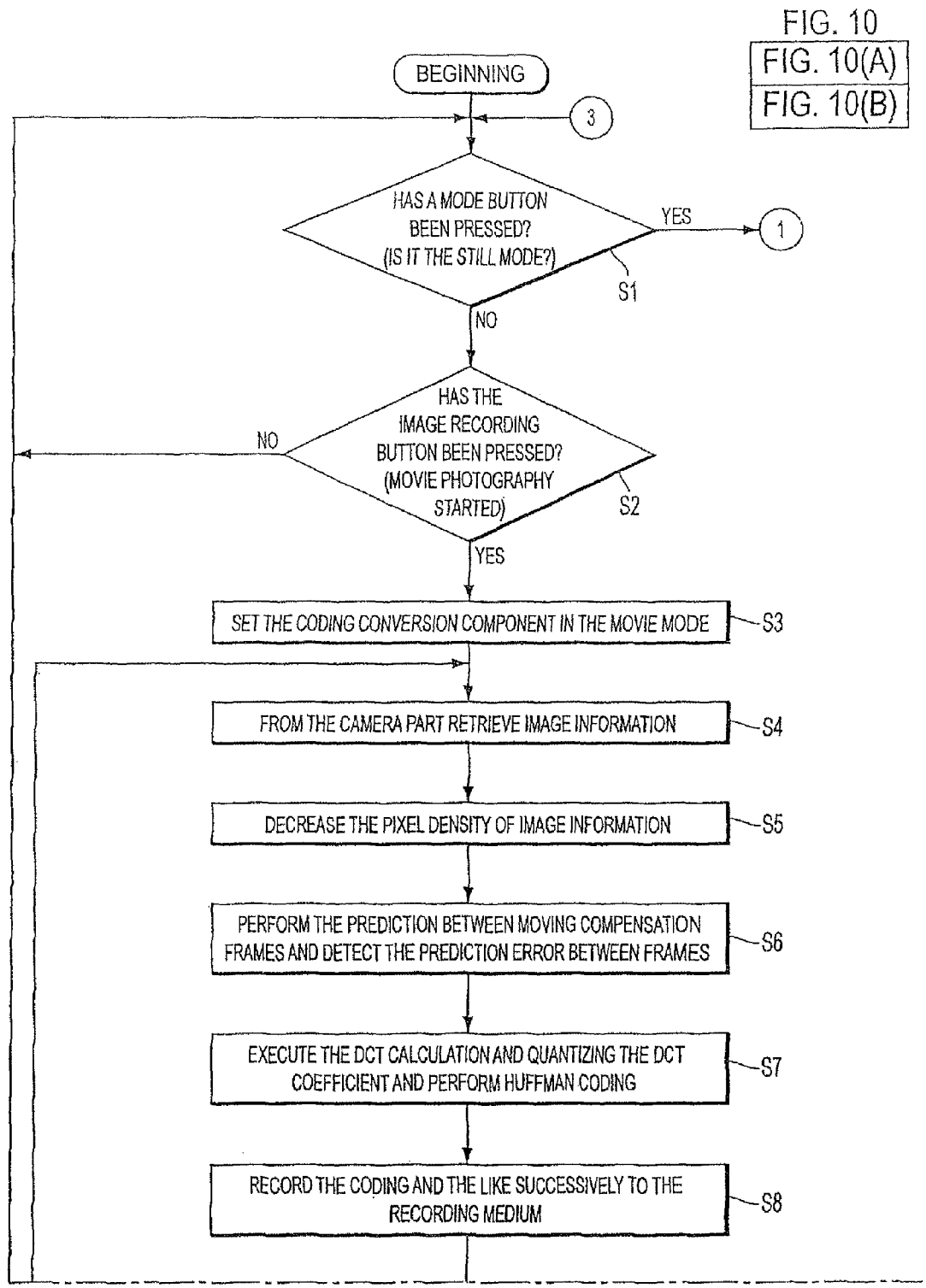
FIG. 10 is flowchart depicting partial operation of the first preferred embodiment of the electronic camera of the present invention.
Figure 10B:
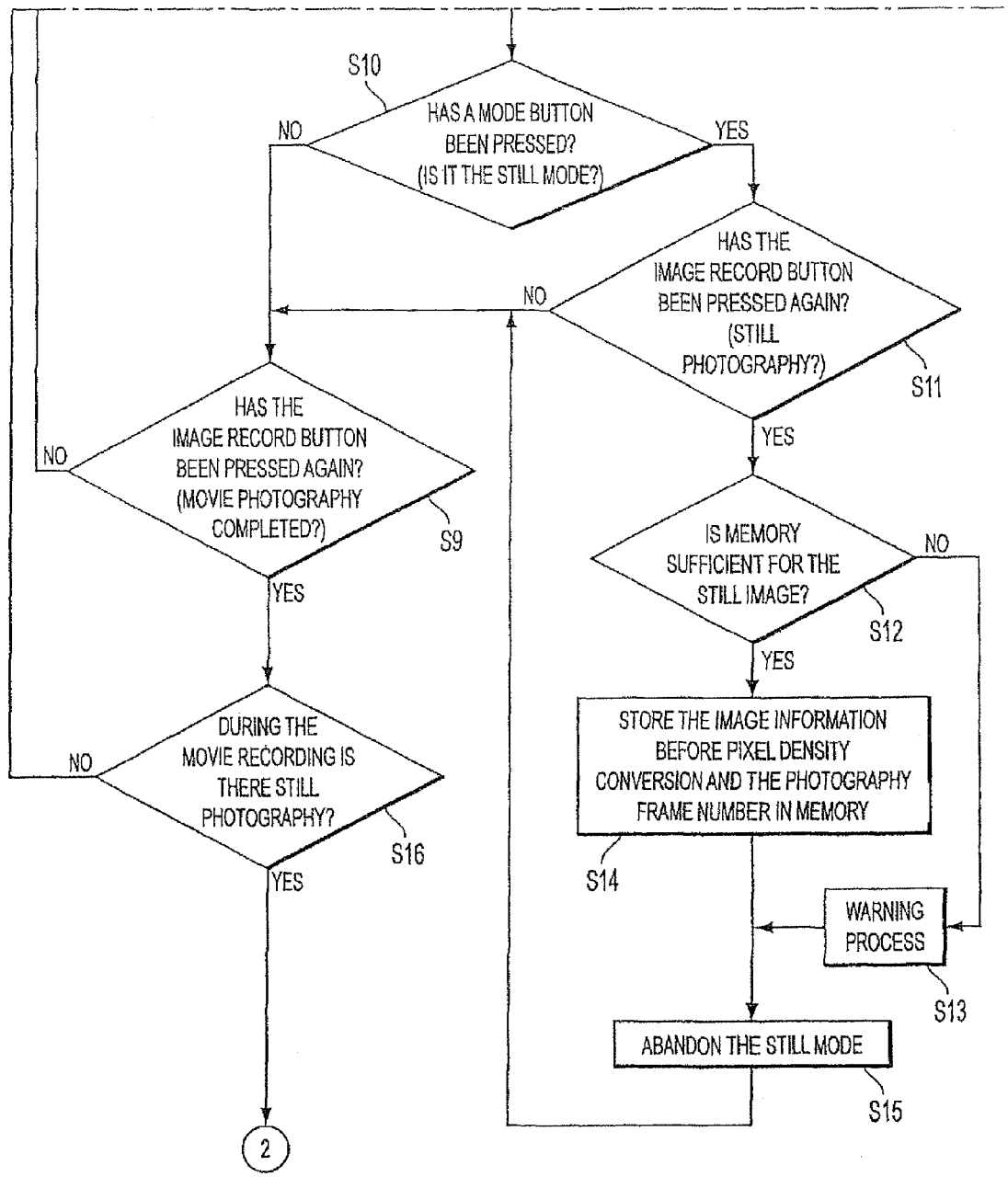
Figure 11:
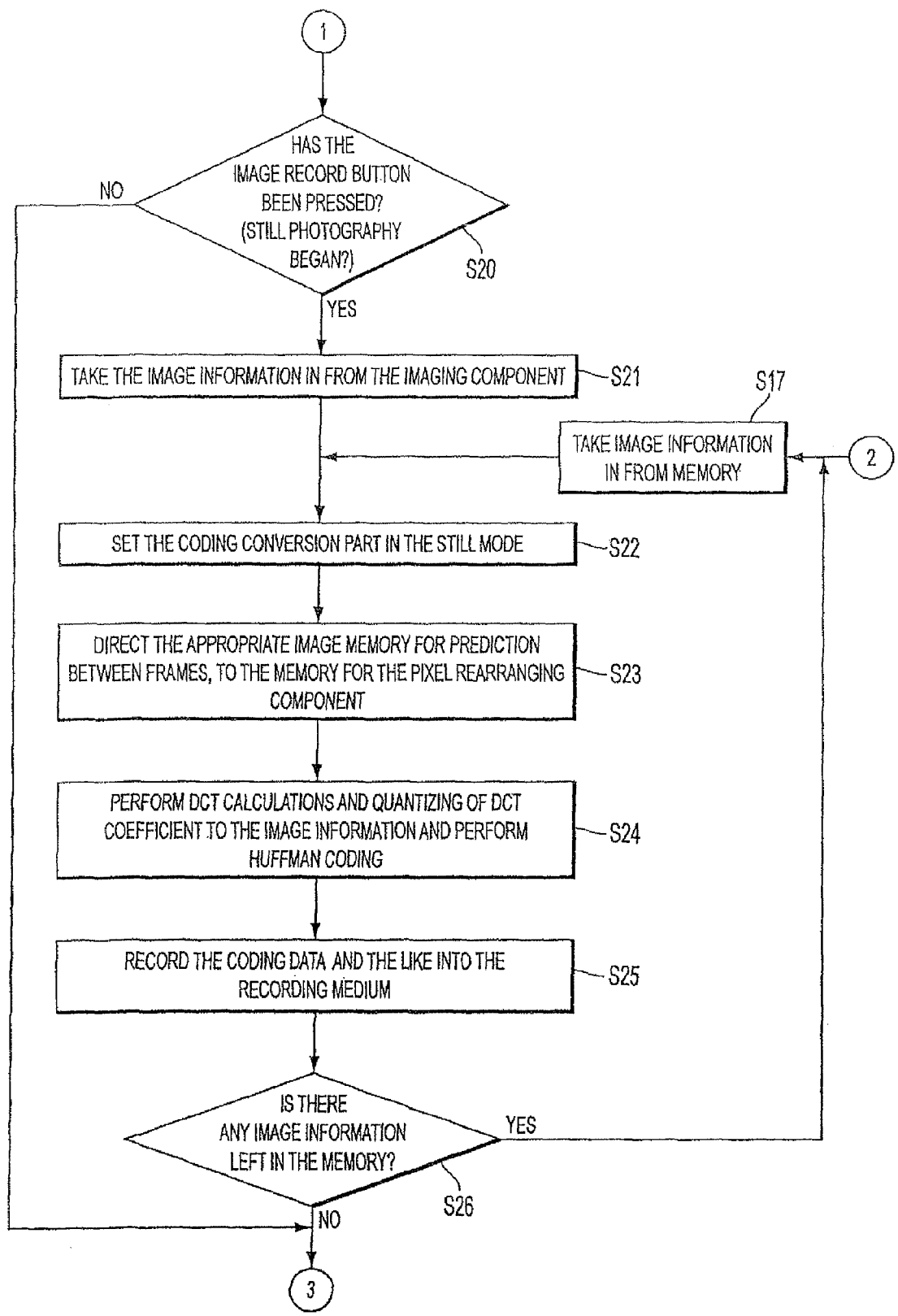
FIG. 11 is, flowchart depicting partial operation of the first preferred embodiment of the electronic camera of the present invention.

FIG. 10 and FIG. 11 are flowcharts that describe the operation of the first embodiment. The operation of the first embodiment is described below using these figures.

First, when the mode button 27 is pressed (FIG. 10 S1), the microprocessor 18 determines that it is the still mode that performs still image photography, and after the liquid crystal display screen 25 is changed to the display used for the still mode, the process moves to the step S20, which will be explained later.

When the mode button 27 has not been pressed (FIG. 10 S1), the microprocessor 18 determines that it is the movie mode that performs photography of moving images.

In the movie mode, when the image recording button 26 has been pressed (FIG. 10 S2), the microprocessor 18 sets the coding conversion component 21 as appropriate for the movie mode (FIG. 10 S3). That is, the microprocessor 18 sets the output selection of the first switch 34 to the first input side via a compression mode controller 46, and, specifically, the third switch 44 and the second switch 45 are defined in an ON state.

At this time, the image density converter successively retrieves image information, that has been digitized, from the camera part 11a (FIG. 10 S4). The image density converter 16 divides the image information into 2×2 pixel blocks, respectively, and reduces the density to a pixel density of 480×640 pixels (FIG. 10 S5). At this time, the pixel density in the vertical direction becomes equivalent to 480, after excluding the retrace time, from the number of scanning lines, 525, in the vertical direction in the NTSC method.

The microprocessor 18 changes over the output selection of the interface component 20, and transmits the output of the image density converter 16 to the coding conversion component 21. Within the coding conversion part 21, high efficiency coding corresponding to the moving image is executed in the following manner:

First, in the pixel arranging component 31, the image pixels are divided into 8×8 pixel blocks and are output. The subtracting device 32 writes in these pixel blocks and calculates the differential, i.e., the prediction error between the pixel blocks and the pixel blocks predicted between the frames in the motion compensation component 43 (FIG. 10 S6).

The DCT calculator 35 converts the 8×8 pixel value into 64 individual DCT coefficients by executing a discrete cosine transform for this prediction error. The quantizer 36 quantizes these DCT coefficients according to a fixed quantizing table.

The variable length coder 38 converts the quantized DCT coefficients to a variable code such as a Huffman code, and outputs it to the data multiplexer 39 (FIG. 10 S7).

On the other hand, in the reverse quantizer 37, the reverse DCT calculator 40 and the adding part 41, decoding of the image information is performed based on the quantized DCT coefficient. The decoded image information is stored successively in the image memory 42.

For example, the compression/decompression process can be performed according to the JPEG standards for still images, and according to the MPEG standards for moving images. Other compression techniques can also be used with the invention.

The moving vector detection component 33 compares the former decoded image information stored in the image memory 42 with the current image information and detects the moving vector based on a rigid body hypothesis of the object. A moving vector detected in this manner, in conjunction with being transferred to the data multiplexer 39, is used in prediction between frames in the motion compensation component 43.

On the other hand, in a control header generator 47 (FIG. 9), header information is generated that includes a quantizing table, a Huffman coding table, and the like, and is transmitted to the data multiplexer 39. In the data multiplexer 39, data transmitted from the variable length coder 38, the moving vector detection component 33 and the control header generator 47 is multiplied and output to the system bus 19. The disk drive component 23 successively retrieves this data, and records it in the magnetooptical recording medium 24 (FIG. 10 S8).

By repeating the recording operation described above until the image recording button 26 has again been pressed (FIG. 10 S9), a moving-image image file is, created on the magnetooptical recording medium 24.

On the other hand, when the mode button 27 and the image recording button 26 have been simultaneously or successively pressed during the recording period of the moving image (FIG. 10 S10, S11), the microprocessor 18 determines that there has been an external command for still photography, and one frame of image information is temporarily stored in the following manner:

First, it is determined whether one frame of image information can be housed in the memory 22 to which it is temporarily stored (FIG. 10 S12). Then, when the amount of free memory capacity is determined insufficient, a warning message is displayed on the liquid crystal display screen 25 (FIG. 10 S13), the still mode is abandoned (FIG. 10 S15) and the recording operation of moving images continues as is.

On the other hand, when there is sufficient free memory capacity, the memory I/O component 17 retrieves one frame of image information from the camera part 11a, and temporarily stores this still image in the memory 22 via the system bus 19 (FIG. 10 S14). During this temporary storage operation, the recording operation of the moving image continues as is. Moreover, the temporary storage of the still image can be performed for a plurality of frames, limited only by the capacity of the memory 22.

During the recording operation for this kind of moving image, the moving image recording operation is completed when the image recording button 26 has again been pressed during step S9. At this time, the microprocessor 18, during the recording operation of the moving image, determines whether the aforesaid still image temporary storage operation has been performed (FIG. 10 S16).

At this time, when the still image temporary storage operation has not been performed, the microprocessor 18 returns to step S1 and repeats the above-described operation. On the other hand, when the still image temporary storage operation has been performed, the microprocessor 18 reads out the still image from the memory 22 (FIG. 11 S17), moves to the operation in step S22, which is described later, and executes recording of the still image.

Also, the microprocessor 18 moves to step S20 when the mode button 27 is pressed in step S1 and waits until the image recording button 26 is pressed. In this state, when the image recording button 26 is pressed (FIG. 11 S20), the microprocessor 18 retrieves one frame of a still image from the camera part 11a via the memory I/O component 17. This still image is stored for a time in the memory 22 or the like.

Next, the microprocessor 18 sets the coding conversion component 21 in the still mode for still image compression (FIG. 11 S22). That is, the microprocessor sets the output selection of the first switch 34 to the second input side via the compression mode controller 46, and the third switch 44 and second switch 45 are defined as in the OFF state. Further, the pixel arranging component 31, by re-using the image memory 42 for prediction between the frames, stores the entire still image that has a high pixel density (FIG. 11 S23).

Next, in the pixel arranging component 31, the image information of the still image is divided into 8×8 pixel blocks and output. The DOT calculator 35 converts the 8×8 pixel block into 64 individual DCT coefficients by executing a discrete cosine transform on this pixel block. The quantizer 36 quantizes these DCT coefficients according to a fixed quantizing table. The variable length coder 38 converts the quantized DCT coefficients into a variable length code such as a Huffman code and outputs it to the data multiplexer 39 (FIG. 11 S24).

On the other hand, in the control header generator 47, header information is generated including a quantizing table and a Huffman coding table. This header information is transmitted to the data multiplexer 39. In the data multiplexer 39, the data transmitted from the variable length coder 38 and the control header generator is multiplied and output to the system bus 19. The disk drive component 23 successively retrieves this data and records it as an image file of a still image in the magnetooptical recording medium 24 (FIG. 11 S25).

Then, the microprocessor 18 investigates whether any other still images that have been given temporary storage in the memory 22 yet remains (FIG. 11 S26). When a still image yet remains in the memory 22, the microprocessor 18 returns to step S17 and performs retrieval of image information. On the other hand, when still images are no longer there, the microprocessor 18 returns to step S1.

As described above, in the first embodiment, the imaging element 13, the A/D converter 14, and the picture image signal processor 15 can share the still image and moving image recording processes. Further, by changing over the pixel density via the image density converter 16, it is possible to record a still image having a higher image quality than that of a moving image, while recording the moving image in an image density matching the scan format.

Furthermore, because the still image has temporarily been given temporary storage in the memory 22, it is possible to reliably photograph a still image even during the recording period of the moving image.

Further, because a common component of the coding conversion component 21 has a dual use as a still image/moving image coding process, the structure of the electronic camera, the calculation process algorithm or the like can be made to be more concise. Furthermore, by pressing the mode button 27, it is possible for the image recording button 26 to have a dual use as a still image/moving image recording switch.

Figure 12:
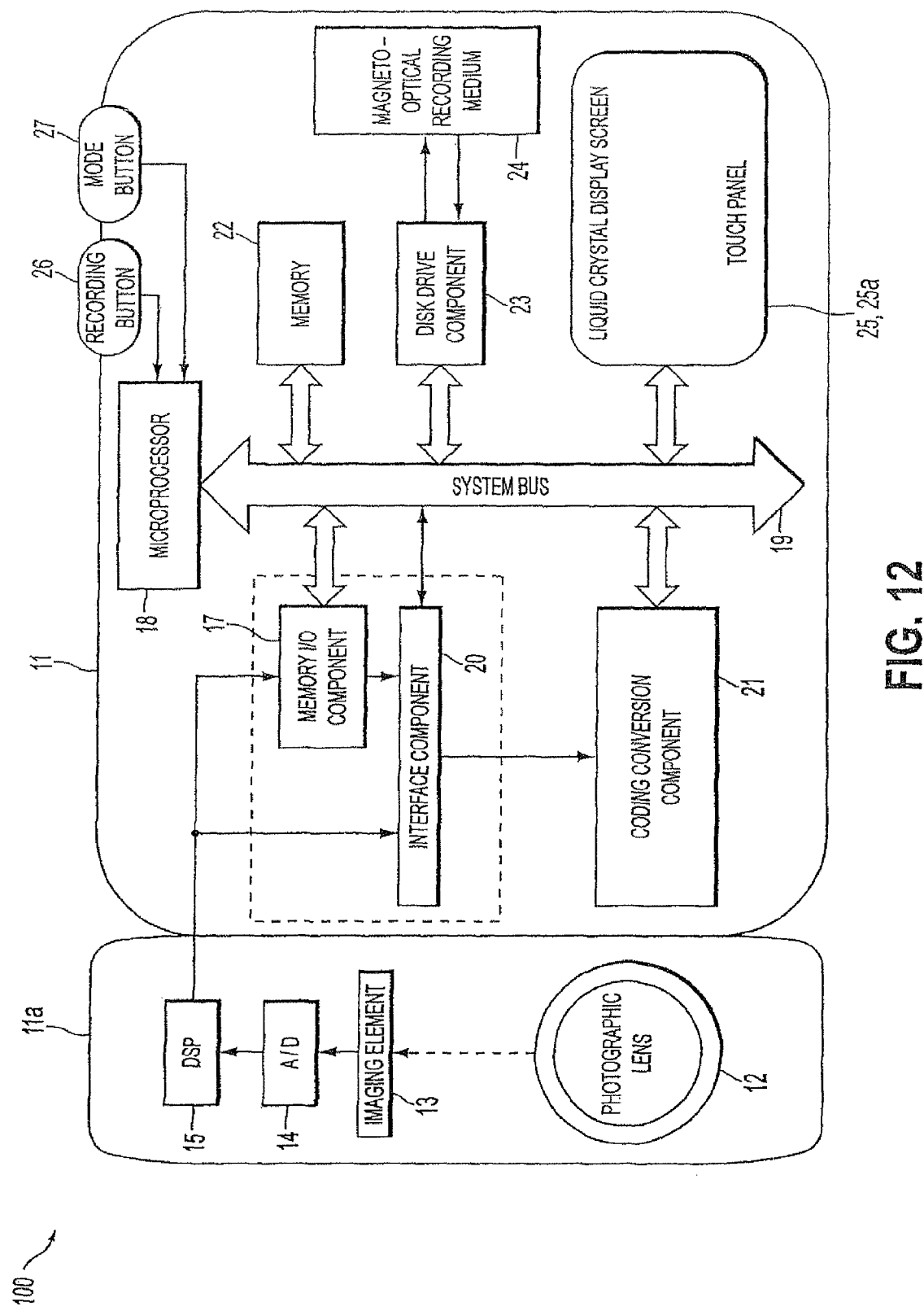
FIG. 12 is a block diagram illustrating a second preferred embodiment of the electronic camera of the present invention.

Next, a second preferred embodiment of the present invention is described. FIG. 12 is a block diagram of the second preferred embodiment of the present invention. A feature of the structure of the second embodiment is that the image density converter 16 (FIG. 7) is omitted. Moreover, the structural elements that are the same as the structural elements shown in FIGS. 7-9 are denoted with the same reference numbers and any repetitive explanation here is omitted.

With respect to FIGS. 4 and 5, the imaging means 1 includes the photographic lens 12, the imaging element 13, the A/D converter 14, and the picture image signal processor 15. The moving image recording means 3 includes the disk drive component 23 and the command controlling recording of the moving image of the microprocessor 18. The still image recording means 4 includes the disk drive component 23 and the command controlling the recording of the still image of the microprocessor 18. The image compression means 7 includes the coding conversion component 21. A compression rate changing means 8 shown in FIG. 4 includes the compression mode controller 46, the control header generator 47 and the command changing the quantizing table of the microprocessor 18. The buffer means 5 includes the memory I/O component 17 and the memory 22.

Figure 13A:
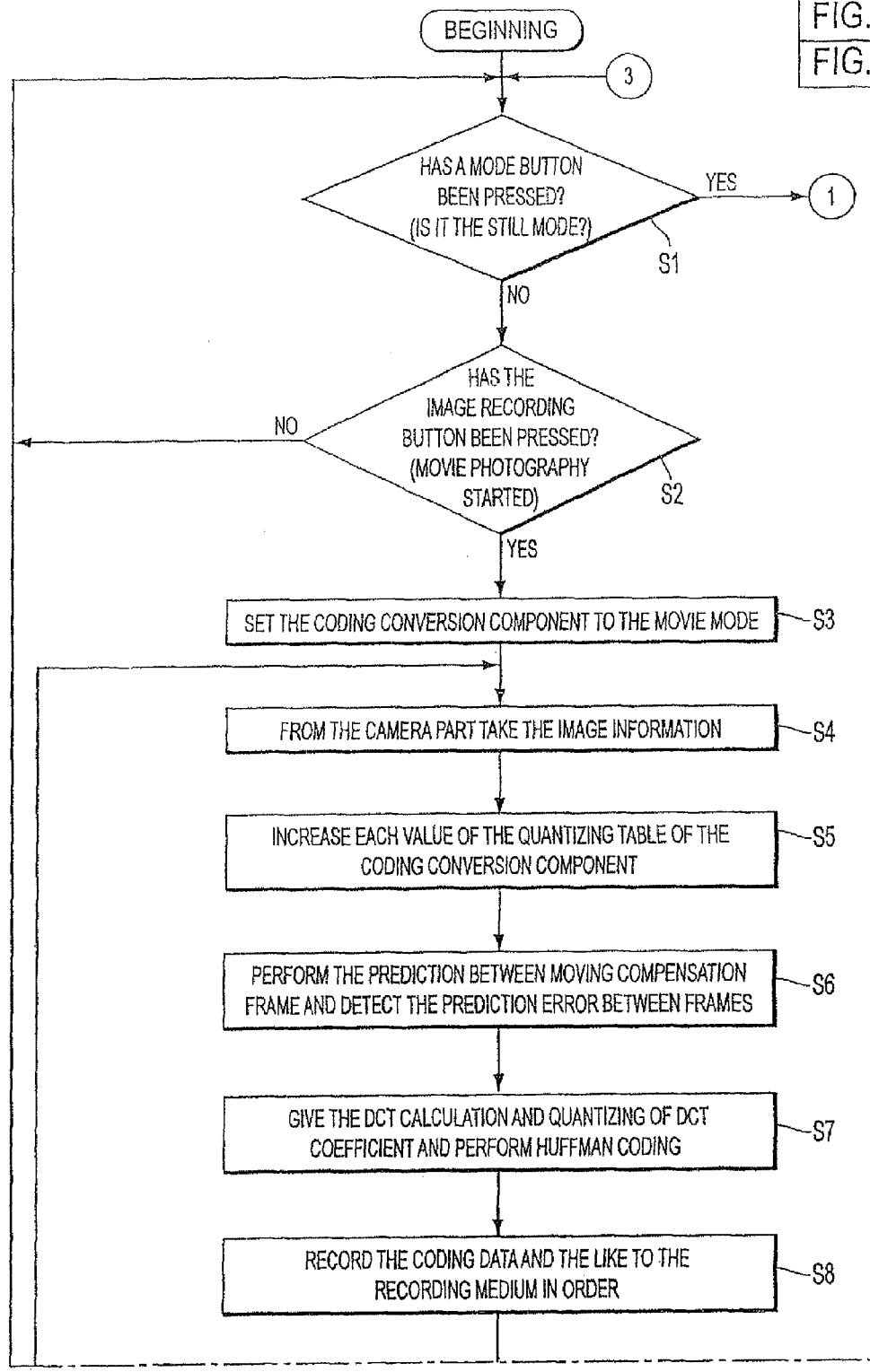
FIG. 13 is a flowchart depicting partial operation of the second preferred embodiment of the electronic camera of the present invention.
Figure 13B:
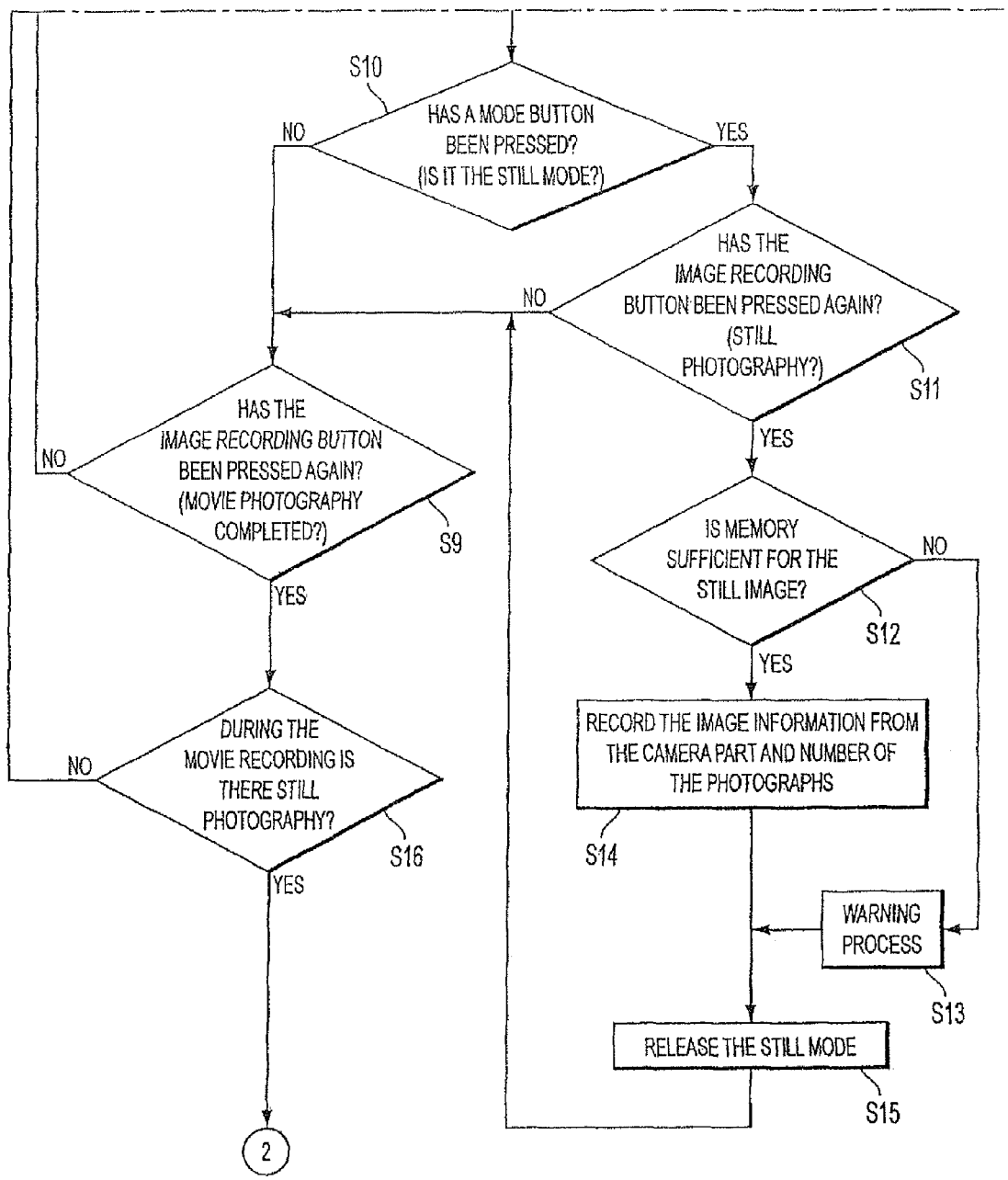
Figure 14:
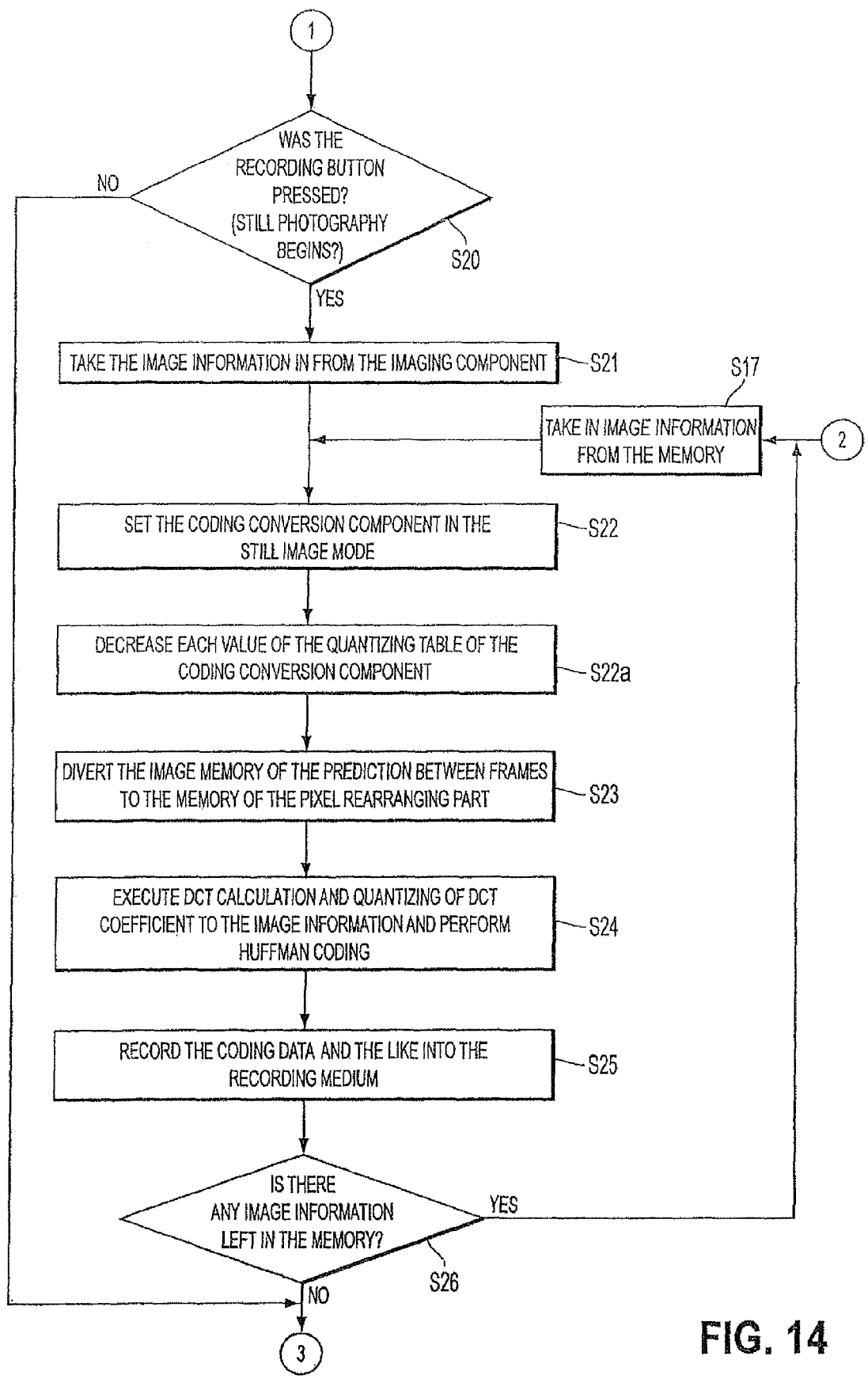
FIG. 14 is a flowchart depicting partial operation of the second preferred embodiment of the electronic camera of the present invention.

FIGS. 13 and 14 are flowcharts describing the operation of the second embodiment of the present invention. The main features in the operation of the second embodiment of the present invention are the following two points:

1) When recording a moving image, the control header generator 47 generally changes each value of the quantizing table to a greater value (FIG. 13 S5); and 2) When recording a still image, the control header generator 47 generally changes each value of the quantizing table to a smaller value (FIG. 14 S22a).

Due to this operation, in the second embodiment of the present invention, the image compression rate for still images is suppressed so that it is low, and the inferiority of quality during playback of the still image is reduced. Further, with regard to a moving image, it is possible for the image compression rate to become high, and to suppress the file capacity of the moving image so that it is low. Furthermore, because the memory 22 temporarily gives temporary storage to the still image, it is possible to reliably record still images even during the moving image recording period.

Figure 15:
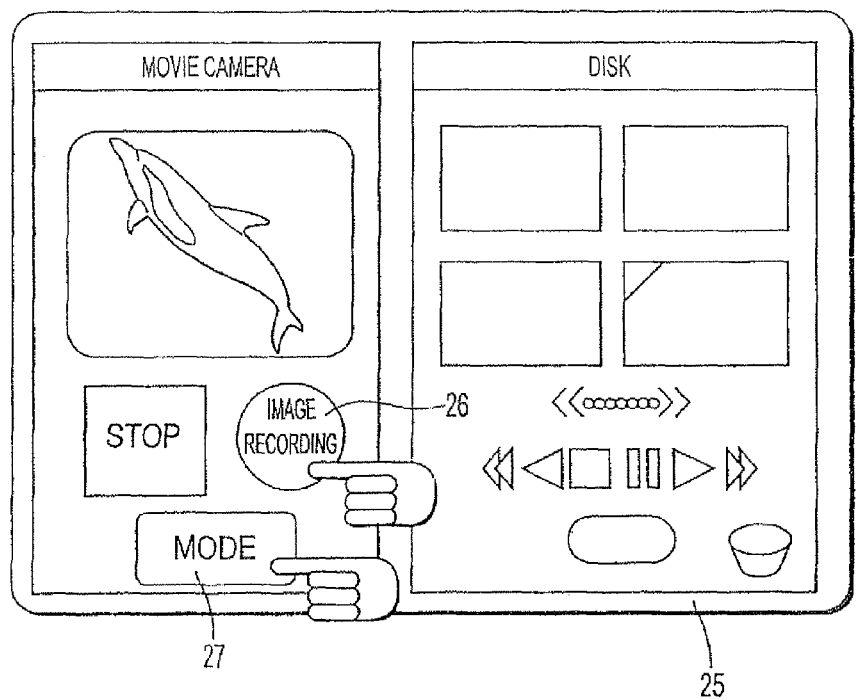
FIG. 15 is a first example display shown on a display screen of the electronic camera of the present invention.
Figure 16:
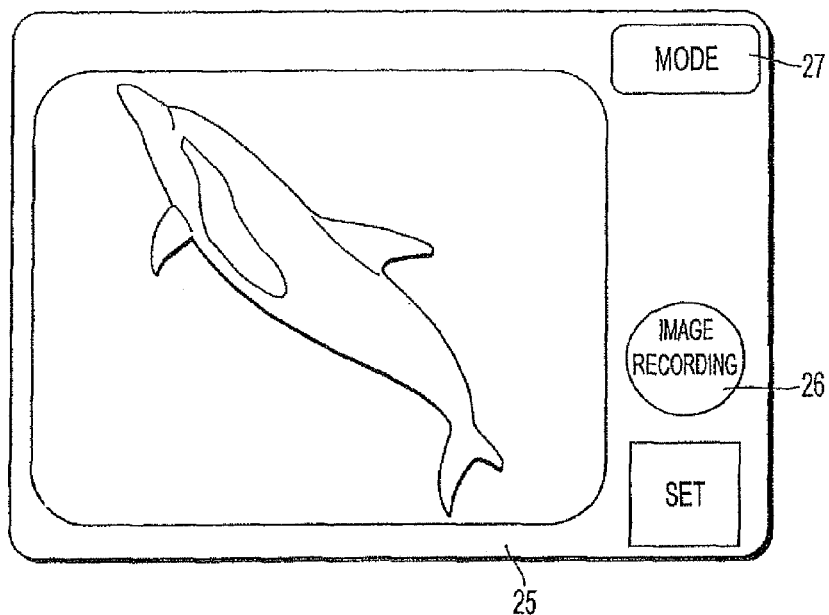
FIG. 16 is a second example display shown on the display screen of the electronic camera of the present invention.
Figure 17:
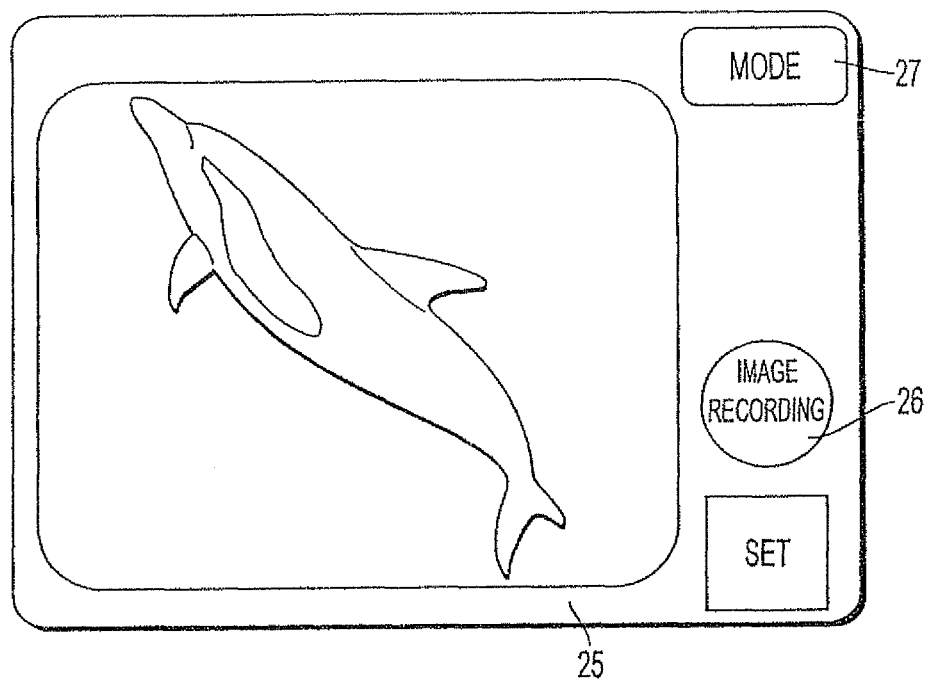
FIG. 17 is a third example display shown on the display screen of the electronic camera of the present invention.

Moreover, although in the embodiment described above, manual image recording operations are received by the image recording button 26 and the mode button 27 provided on the main body 11, the structure of the present invention is not limited to this. For example, it is also possible to display an operation screen (i.e., a user interface screen), such as is shown in FIGS. 15-17, that is displayed on the liquid crystal display screen 25, and to receive manual operations via the touch panel 25a. In this case, it is optimum, when the mode buttons 27 shown in FIGS. 16 and 17 are each respectively pressed, to display these screens as mutually interchangeable.

Further, in the embodiments described above, although the magnetooptical recording medium 24 has been used as the recording medium, the present invention is not limited to specific materials or structural form of recording medium; it is acceptable to use any recording medium that can record image information. For example, an optical recording medium, a magnetic recording medium, or a memory card may be used.

Furthermore, in the embodiments described above, although the still image playback operation has not been destribed, when printing on a paper medium such as a video printer, for example, it is acceptable to playback still images as is, with its high pixel density. Further, when the pixel density is regulated on the video printer side, means may be provided to convert the still image to that pixel density.

On the other hand, when the still image is shown on the display screen, a still image of a high pixel density may be converted to a pixel density matching the scan format of the display screen by appropriating the pixel density conversion means 2 used during recording for use during playback. Due to this structure, there is no need to exclusively provide pixel density conversion means for playback only, allowing marked simplification of the playback display circuit of the electronic camera or the playback process algorithm.

As described above, while the imaging means shares a recording process for still images and moving images, it is possible to suitably change over the image quality for still images and the image quality for moving images by the pixel density conversion means. Further, by changing over the pixel density conversion means, the moving image is suitably recorded as appropriate to the scan format of the display screen. Therefore, the pixel density of the still image is wholly unbound by the scan format of the display screen, allowing a flexible design suitable to the intended purpose of the structure.

While the imaging means shares a recording process for still images and moving images, it is possible to record still images with a higher image quality than that of moving images. Due to the buffer means temporarily storing still images, it is possible to reliably image still images even during recording of moving images.

Accordingly, it has been made possible for the operator to record, without any concern for whether it is during the recording of a moving image or a snapshot in which the operator is interested as a still image having a high image quality. Because the common component relating to the process within a field or the process within a frame of a coding conversion component has the dual use of processing still images and moving images, efficient simplification is possible of the structure, the calculation process algorithms, or the like, in an electronic camera. While the imaging means and the image compression means share the recording process for still images and moving images, it is possible to record a still image having a higher image quality than a moving image. Due to the buffer means temporarily storing still images, it is possible to reliably image a still image even when recording a moving image.

Accordingly, it has been made possible for the operator to record, without any concern for whether it is during the recording of a moving image or a snapshot in which the operator is interested as a still image having a high image quality. By changing over the changeover switch, the recording switch has a dual use as a switch activating the still image recording means and the moving image recording means. Therefore, the operational quality of the image recording operation has been enhanced.

The present invention has been described with particularity in connection with the specific embodiments. It should be appreciated, however, that changes may be made to the disclosed embodiments without departing from the invention as defined by the following claims.

What is claimed is:

1. A digital electronic device comprising:
   an imaging device that generates successive image signals;
   an analog to digital converter that converts an output of the imaging device to digital image signals;
   a compression unit that performs a first compression for digital moving images and a second compression, different from the first compression, for digital still images;
   a mode selector that selects one of a moving image recording mode in which recording of moving images can be performed and a still image recording mode in which recording of still images can be performed;
   a memory unit;
   a display that includes a touch panel having an operation button, wherein the operation button includes an operation button for performing a predetermined function;
   a recording unit that records the compressed digital moving images and the compressed digital still images into the memory unit; and
   a control unit electrically connected to the compression unit, the mode selector, the display and the recording unit, the control unit causing the display to simultaneously display either of the moving or still images and information representative of the mode selected by the mode selector;
   wherein a displayed position of the operation button for performing the predetermined function on the touch panel when the moving image recording mode is selected is substantially same as a displayed position of the operation button for performing the predetermined function on the touch panel when the still image recording mode is selected, and
   wherein the operation button for performing the predetermined function is an operation button for initiating recording of the moving image on the touch panel when the moving image recording mode is selected, and is an operation button for initiating recording of still image on the touch panel when the still image recording mode is selected.

2. A digital electronic device comprising:
   an imaging device that generates successive image signals;
   an analog to digital converter that converts an output of the imaging device to digital image signals;
   a compression unit that performs a first compression for digital moving images and a second compression, different from the first compression, for digital still images;
   a mode selector that selects one of a moving image recording mode in which recording of moving images can be performed and a still image recording mode in which recording of still images can be performed;
   a memory unit;
   a display that includes a touch panel having an operation button, wherein the operation button includes an operation button for performing a predetermined function;
   a recording unit that records the compressed digital moving images and the compressed digital still images into the memory unit; and
   a control unit electrically connected to the compression unit, the mode selector, the display and the recording unit, the control unit causing the display to simultaneously display either of the moving or still images and information representative of the mode selected by the mode selector;

wherein a displayed position of the operation button for performing the predetermined function on the touch panel when the moving image recording mode is selected is substantially same as a displayed position of the operation button for performing the predetermined function on the touch panel when the still image recording mode is selected, and wherein the operation button for performing the predetermined function is a mode change operation button for changing a mode between the moving image recording mode and the still image recording mode.

* * * * *